July 7, 1936.  D. V. McPARLIN  2,046,341
METHOD OF AND APPARATUS FOR REMOVING SHEATHS FROM CABLES AND THE LIKE
Filed March 16, 1935
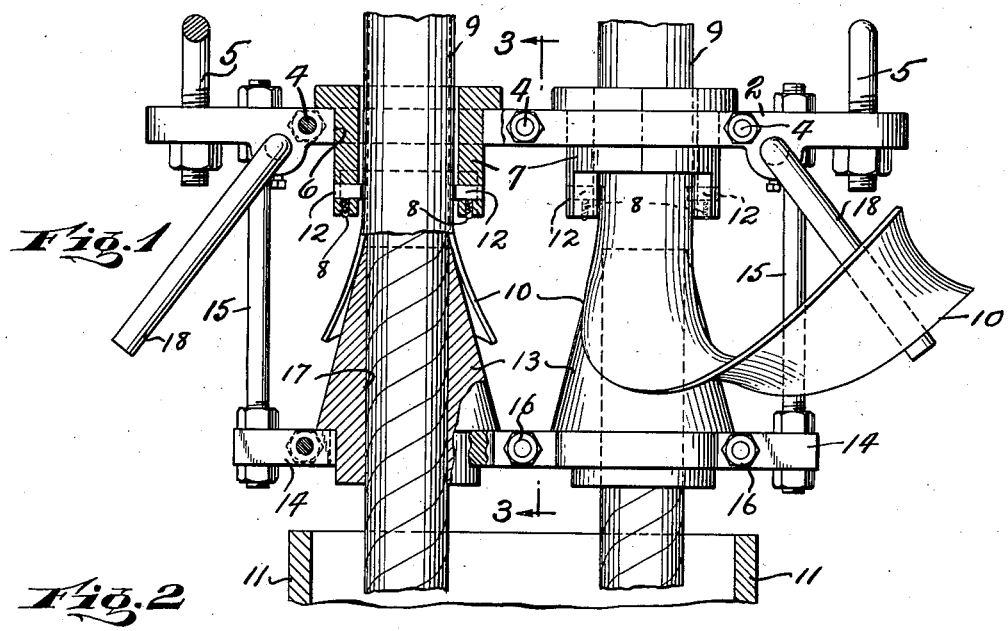
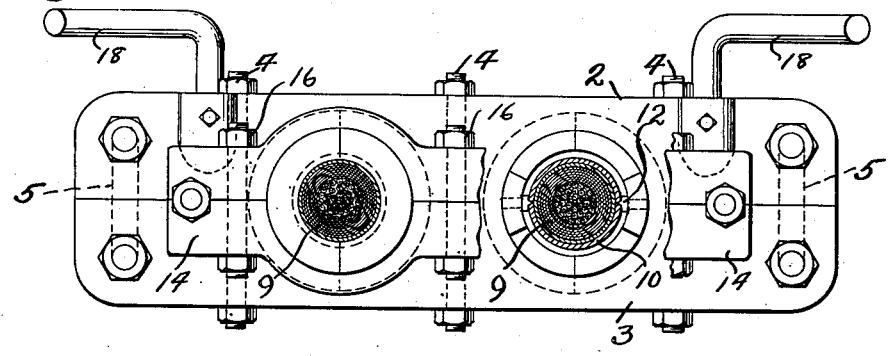
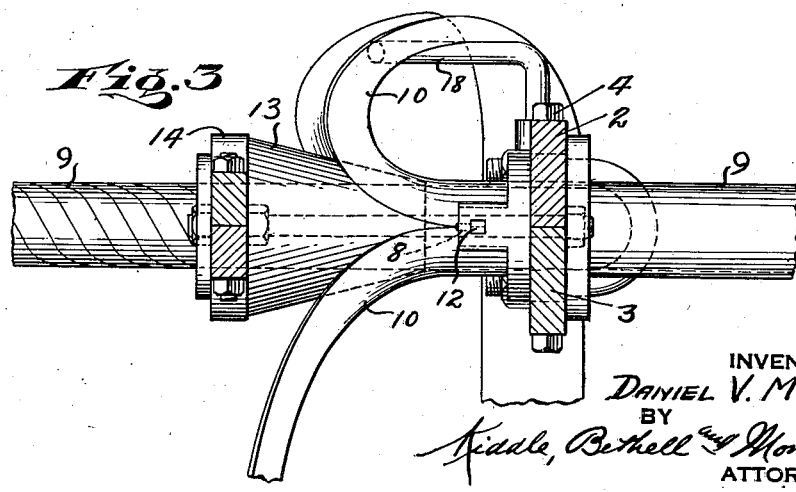
INVENTOR
DANIEL V. McPARLIN
BY
Kiddle, Bethell and Montgomery
ATTORNEYS Patented July 7, 1936

2,046,341

UNITED STATES PATENT OFFICE 2,046,341

METHOD OF AND APPARATUS FOR REMOVING SHEATHS FROM CABLES AND THE LIKE

Daniel V. McParlin, Passaic, N. J., assignor to The Okonite-Callender Cable Company, Incorporated, Paterson, N. J., a corporation of New Jersey Application March 16, 1935, Serial No. 11,382

12 Claims. (Cl. 164—36)

My invention relates to an improved method of and apparatus for removing sheaths from electric cables and the like.

The invention is particularly well adapted for use in installing electric cable systems such as disclosed, for example, in the copending application of Charles E. Bennett Serial No. 553,714 filed July 29, 1931. In that application there is disclosed a cable system for the transmission of high tension electrical energy in which the impregnated paper insulated cable conductors are drawn into a pipe which is eventually filled with oil under high pressure.

Such installations contemplate oil impregnation of the cable at the factory and shipment of the impregnated cable to the job sealed in a temporary lead sheath which prevents loss of oil from the impregnated cable, protects the insulation of the cable against mechanical injury in transit and against moisture absorption, this temporary sheath being removed as the cable is drawn into its pipe or conduit.

The present invention provides an improved method and apparatus for the ready removal of this temporary lead sheath as the cable is being drawn into the pipe.

The invention also provides a novel apparatus for carrying out the method just mentioned.

While I will refer to the employment of my improved method and apparatus for removing temporary lead sheaths in installations of a specific nature it is to be understood that this is merely illustrative as obviously my invention has other applications.

In the accompanying drawing:

Fig. 1 is a plan view of an embodiment of my invention;

Fig. 2 is a front elevation of the same; and

Fig. 3 is a sectional view taken on line 3—3 of Fig. 1.

Referring to the drawing in detail the frame of my improved apparatus is made up in two sections 2 and 3 secured together in any suitable manner such as by bolts 4. Eyes or loops 5 also bolted to the frame 1 for convenience in transporting the device also serve to secure the sections 2 and 3 to each other.

The frame section 2 is provided with semicircular cut-out portions which register with corresponding semicircular cut-out portions in the section 3 so that when the device is assembled circular openings 6 are provided.

The openings 6 each receive a hollow bushing or die 7 which is securely held in place when the sections are bolted to each other and which can be removed for replacement by loosening the bolts 4 and removing the eyes 5.

The interior diameter of these dies is sufficient to permit a cable 9 with its enclosing temporary lead sheath 10 to pass therethrough as the cable is being drawn into the pipe 11.

Each of the dies 7 is provided with diametrically opposed cutters 12 which project inwardly to a depth sufficient to cut or score the lead sheath 10 of the cable. These cutters are adjustably held in place by means of set screws 8.

As the cables are drawn or pulled from the cutters 12 they pass into plows 13 which engage the sheath 10. The plows are supported by a bracket 14 which in turn is carried by rods 15 projecting from the frame 1. The bracket 14 like the frame 1 is made in two sections secured together by bolts 16 for ready removal of the plows 13.

Each plow 13 is in line with a bushing or die 6 and has a longitudinal bore 17 the diameter of which is substantially the same as the diameter of the unsheathed insulated cable so that each plow functions as a guide for a cable. Each plow is frusto-conical in shape the larger end of the cone being mounted in the support 14 and the smaller end lying adjacent the cutters 12. The wall of each plow tapers to a sharp edge providing a circular knife edge.

It will be obvious that as the cables are pulled into the pipe 11, guided by the plows 13, the sheath will be scored or cut at opposed points by the knives 12 and as the scored sheath passes into the plows 13 the forward edge of a plow will enter between the temporary sheath and the cable insulation, continued forward movement of the cable in cooperation with the tapered or conical plow effecting removal of the sheath as will be obvious and as shown in Fig. 3.

The frame 1 is provided with guide arms 18 which are mounted thereon for angular adjustment relative to the frame. As the sheath is removed the upper section curls over these arms out of the way of the moving cable, the lower section simply sagging downwardly out of the way.

It is to be understood that any desired number of bushings and plows may be employed depending upon the number of cables to be unsheathed. Likewise the number of cutters may be varied and other changes and modifications may be made in the device herein illustrated and described without departing from the spirit and scope of my invention.

What I claim is:—

1. The method of installing electric cables in a pipe line which method comprises drawing the cable into the pipe line past a stationary plow in the path of the cable whereby the operation of drawing the cable into the pipe line will effect a plowing of the sheath from the cable.

2. Apparatus for removing the metal sheath from sheathed insulated cables comprising scoring means for cutting the sheath and a wedge-shaped member for entry between the sheath and insulation for separating the scored sheath from the insulation.

3. An apparatus for removing lead sheaths from electric cables comprising opposed scoring members for scoring the sheath and a wedge-shaped member in line with said scoring members for entry between the scored sheath and the cable insulation to remove the sheath from the cable.

4. An apparatus for removing lead sheaths from cables comprising a cutting or scoring die and a hollow plow in alignment with each other, said cutter being adapted to cut or score the sheath as the cable is moved through the die and plow, said plow having a bore of sufficient diameter to cause the plow to enter between the sheath and cable insulation to remove the sheath and to guide the cable in its movement through the die and plow.

5. An apparatus of the class described comprising cutters for scoring the metal sheath of a cable, a hollow support for said cutters, the internal diameter of said support being sufficient to receive a sheathed cable, a hollow plow in line with said support, the internal diameter of said plow being approximately the same as the external diameter of the cable over the cable insulation.

6. An apparatus of the class described comprising a frame, a plurality of bushings removably supported in said frame, cutters carried by each of said bushings for scoring the sheaths of electric cables as the same pass through the bushings, a plurality of hollow plows in line with said bushings, a support for said plows carried by said frame, said plows being removably held in said support, said plows being frusto-conical and having their smaller end adjacent said bushings and being of such internal diameter as to engage a cable between its sheath and insulation.

7. An apparatus of the class described comprising a frame, a plurality of bushings removably supported in said frame, cutters carried by each of said bushings for scoring the sheaths of electric cables as the same pass through the bushings, a plurality of hollow plows in line with said bushings, a support for said plows carried by said frame, said plows being removably held in said support, said plows being frusto-conical and having their smaller end adjacent said bushings and being of such internal diameter as to engage a cable between its sheath and insulation, and a guide carried by said frame for guiding the removed sheath from the apparatus.

8. An apparatus for removing the metallic sheath of an electric cable as the same is drawn into a pipe line and adapted to be positioned adjacent the end of the pipe comprising a support, sheath scorers mounted on said support, a plow in alignment with said scorers, said plow being frusto-conical and having its smaller end adjacent said scorers, said scorers scoring the sheath of the cable as the same is drawn into the pipe and said plow engaging the cable between the sheath and insulation, the scored sheath being separated from the insulation of the cable as the sheath rides over said plow.

9. An apparatus for removing the metallic sheath of an electric cable as the same is drawn into a pipe line and adapted to be positioned adjacent the end of the pipe comprising a support, sheath scorers mounted on said support, a plow in alignment with said scorers, said plow being frusto-conical and having its smaller end adjacent said scorers, said scorers scoring the sheath of the cable as the same is drawn into the pipe and said plow engaging the cable between the sheath and insulation, the scored sheath being separated from the insulation of the cable as the sheath rides over said plow, and a guide adjustably mounted on said support for guiding the removed sheath from the apparatus.

10. An apparatus for removing the metallic sheath of an electric cable as the same is drawn into a pipe line and adapted to be positioned adjacent the end of the pipe, comprising a support, diametrically opposed sheath cutters mounted on said support, a plow in alignment with said cutters, said plow being frusto-conical and having its smaller end adjacent said cutters, said cutters scoring the sheath of the cable as the same is drawn into the pipe and said plow engaging the cable between the sheath and insulation, the scored sheath being separated from the insulation of the cable as the sheath rides over said plow.

11. An apparatus for removing metallic sheaths from electric cables as the cables are drawn into a pipe line and adapted to be positioned adjacent the end of the pipe, comprising a support, a plurality of pairs of sheath cutters mounted on said support, a plow for each pair of cutters in alignment with said cutters, said plows being frusto-conical and having their smaller ends adjacent their respective cutters, said cutters scoring the sheath of their respective cables as the same are drawn into the pipe and said plows engaging their respective cables between the sheath and insulation, the scored sheath being separated from the insulation of the cables as the same ride over said plow.

12. An apparatus for removing metallic sheaths from electric cables as the cables are drawn into a pipe line and adapted to be positioned adjacent the end of the pipe, comprising a support, a plurality of pairs of sheath cutters mounted on said support, a plow for each pair of cutters in alignment with said cutters, said plows being frusto-conical and having their smaller ends adjacent their respective cutters, said cutters scoring the sheath of their respective cables as the same are drawn into the pipe and said plows engaging their respective cables between the sheath and insulation, the scored sheath being separated from the insulation of the cables as the same ride over said plow, and an adjustable guide arm adjacent each pair of cutters and plows for guiding the sheath out of the path of the cable as the same is being removed.

DANIEL V. McPARLIN.